United States Patent

Sullivan

[15] 3,685,538

[45] Aug. 22, 1972

[54] FLUID FLOW CONTROL DEVICE

[72] Inventor: Charles E. Sullivan, 15806 Buccaneer Lane, Houston, Tex. 77058

[22] Filed: Sept. 21, 1970

[21] Appl. No.: 73,690

[52] U.S. Cl. ........................................137/504, 251/5
[51] Int. Cl. ..............................................G05d 7/01
[58] Field of Search......137/504, 459, 460, 498, 502, 137/525; 138/45; 251/6, 5

[56] References Cited

UNITED STATES PATENTS

| 2,590,396 | 3/1952 | Garretson | 251/5 X |
| 2,659,387 | 11/1953 | Farris | 251/5 X |
| 3,276,480 | 10/1966 | Kennedy | 137/525 X |

FOREIGN PATENTS OR APPLICATIONS

| 629,964 | 10/1961 | Canada | 251/5 |
| 6,411,144 | 9/1964 | Netherlands | 251/5 |

*Primary Examiner*—M. Cary Nelson
*Attorney*—Charles E. Lightfoot

[57] ABSTRACT

A fluid flow control device having a flexible, resilient sleeve forming a flowway through which the fluid whose flow is to be controlled may flow and including mechanism responsive to an increase in the rate of flow of the fluid beyond a predetermined rate for causing the sleeve to close. The device is constructed and arranged so that the operating parts of the sleeve actuating mechanism are enclosed by the sleeve to isolate the same from contact with the flowing fluid.

10 Claims, 5 Drawing Figures

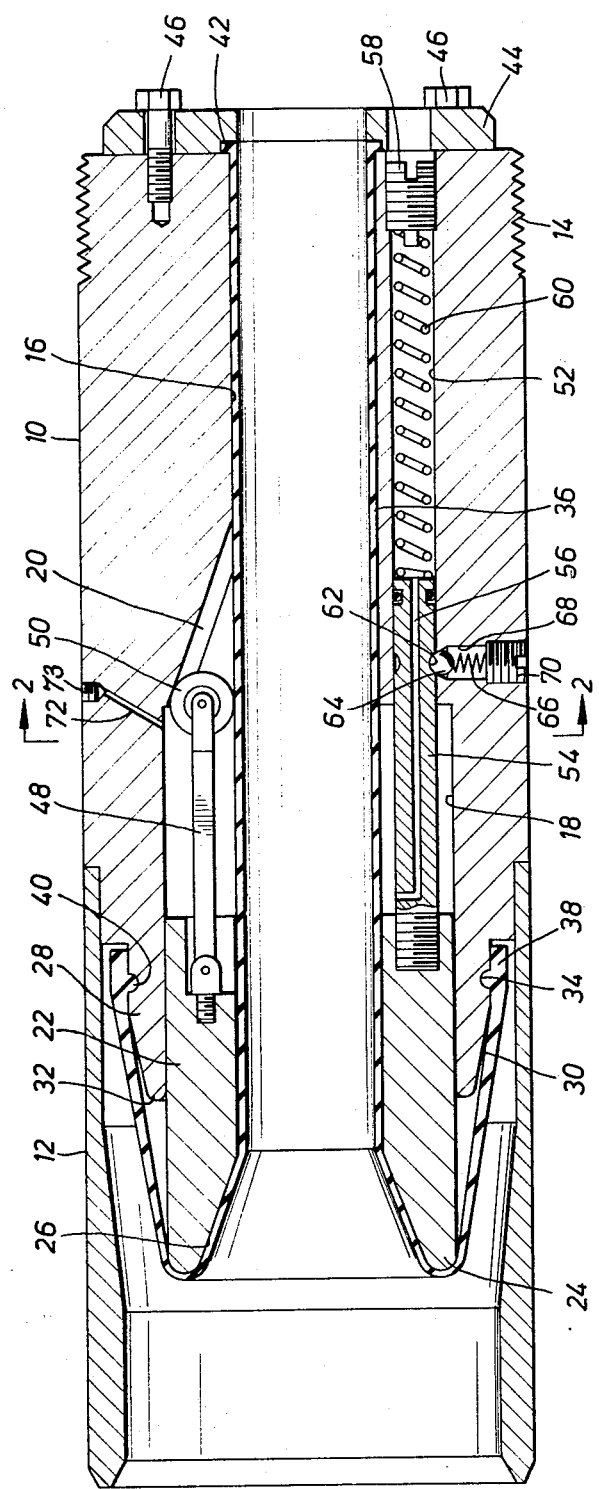
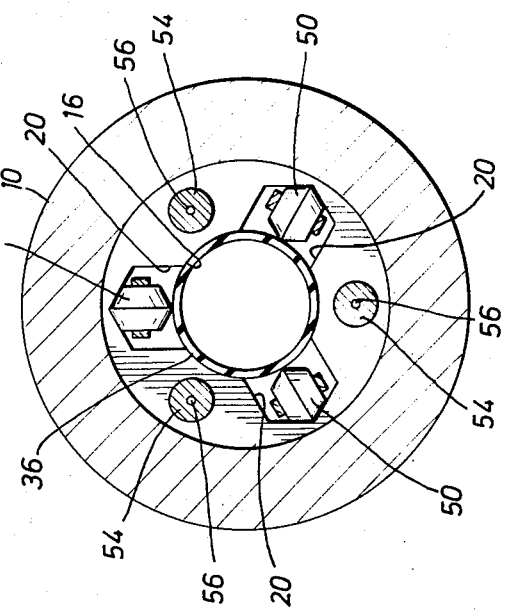
FIG. 1
FIG. 2
Charles E. Sullivan
INVENTOR
BY Charles E. Lightfoot
ATTORNEY

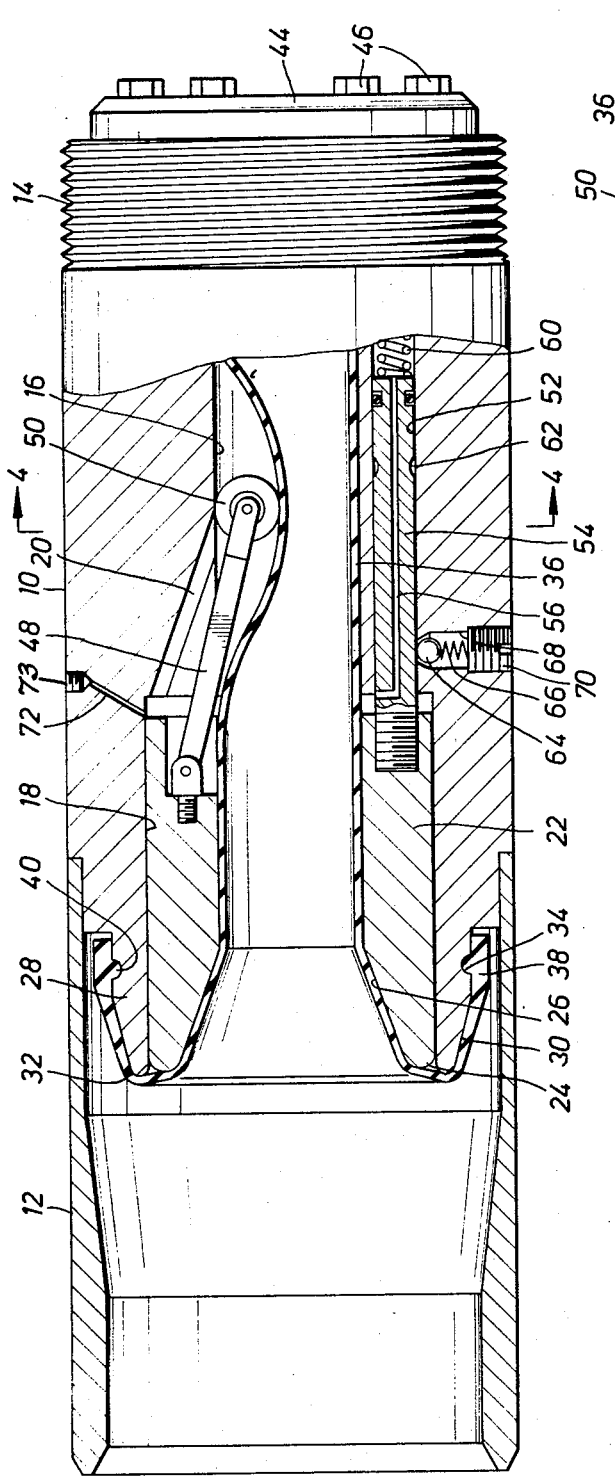

FLUID FLOW CONTROL DEVICE

BACKGROUND OF THE INVENTION

In the drilling and operation of oil and gas wells, and in other kinds of equipment in which there is a flow of fluid under pressure, it is customary to provide means for shutting off the fluid flow in the event of a sudden increase in the pressure or in the rate of flow of the fluid.

Flow control devices for this purpose are frequently operated by pressure from a source other than the flowing fluid or by mechanical means.

Under some circumstances, it is desirable to make the operation of equipment of this kind automatic, that is, responsive to an increase in the pressure of the flowing fluid or its rate of flow to reduce or shut off the flow. Such automatic actuation is particularly desirable in the case of the drilling or operation of oil and gas wells under conditions in which a sudden increase in pressure or flow, commonly referred to as a "blow out", may occur, likely to result in great damage to the equipment and loss of fluid.

Flow control equipment is required by law in many oil and gas well drilling operations, and its absence or failure has frequently contributed to extensive spills and pollution of large areas when such drilling operations are conducted in submerged locations.

Well pipes are often provided with chokes intended to facilitate the control of flow, but devices of this kind do not ordinarily function to completely shut off fluid flow when necessary or desirable.

In the drilling and production of oil and gas wells, as well as in the operation of fluid flow systems, there is a need for flow control equipment which may be incorporated in the flow line to be actuated by an increase in the pressure or rate of flow of fluid therethrough and in which the operating parts of the mechanism are enclosed and isolated against contact with the flowing fluid to prevent corrosion or other contamination likely to interfere with the operation of or damage the flow control equipment.

SUMMARY OF THE INVENTION

The flow control device of the present invention, briefly described, comprises a cylindrical housing adapted to be positioned in a flow line and through which fluid under pressure may flow and within which mechanism is disposed for actuation in response to an increase in the rate of flow of the fluid to shut off such flow.

The mechanism includes a cylindrical sleeve in the housing forming a flowway for the flow of the fluid therethrough and means movable in response to an increase in the flow of the fluid therethrough for applying a radial force to the wall of the sleeve to indent the sleeve and bend the wall of the sleeve radially inwardly to close the sleeve.

Means is provided for reactuating the mechanism by equalizing the upstream and downstream pressures to remove the closing force on the sleeve to allow the same to reopen.

The sleeve, housing, and operating parts of the mechanism, are constructed and arranged so that the sleeve forms a seal located to enclose the moving parts of the mechanism and isolate the same from the flowing liquid to protect the operating parts from contamination by foreign material and corrosion.

Means is also provided for yieldingly resisting closing movement of the device in response to surges of flow of short duration whereby the flowway does not close suddenly in response to such surges.

The invention has for an important object the provision of flow control mechanism which closes automatically in response to an increase in the rate of flow of a flowing fluid above a predetermined rate, and wherein the operating parts are enclosed and protected from contamination by the flowing fluid.

BRIEF DESCRIPTION OF THE VIEWS OF THE DRAWINGS

FIG. 1 is a longitudinal, central, cross sectional view of a preferred embodiment of the invention, showing the same in its fully open condition;

FIG. 2 is a cross sectional view, taken along the line 2 — 2 of FIG. 1, looking in the direction indicated by the arrows;

FIG. 3 is a view similar to that of FIG. 1, showing the device in its closed condition;

FIG. 4 is a cross sectional view taken along the line 4 — 4 of FIG. 3, looking in the direction indicated by the arrows; and, FIG. 5 is a longitudinal, central, cross sectional view on a reduced scale of a pipe fitting by which the device of the invention may be installed in a flow line showing the invention in place therein.

DETAILED DESCRIPTION OF A PARTICULAR EMBODIMENT OF THE INVENTION

Referring to the drawings in greater detail, the flow control device of the invention comprises a cylindrical housing formed in two tubular parts 10 and 12, respectively, adapted to be fitted together, and which may be connected together in any suitable manner, as by welding, threading, adhesive bonding, or the like. The body part 10 forms a part of and encloses the moving parts of the mechanism, while the inlet part guide 12 forms a cover for the front portion of the same. The body part 10 is externally threaded at its free end, as seen at 14.

The part 10 is formed of a longitudinal bore 16 which opens at its inner end into an enlarged counterbore 18.

A plurality of peripherally spaced, longitudinally extending, radially inwardly opening grooves 20 are formed in the part 10 which taper inwardly from the bottom of the counterbore 18 in the direction of the flow of the fluid through the apparatus, three such grooves evenly spaced apart about the bore 16 being shown in the present illustration.

A cylindrical actuator member 22 is slidably fitted into the open end of the counterbore 18, which member has a rounded outer peripheral edge portion 24 and is formed with an internal outwardly flaring face 26 at its outer end.

The part 10 has an externally reduced front end portion 28 which is externally, longitudinally tapered as seen at 30 and whose free end is rounded as shown at 32. The externally reduced portion 28 has an external groove 34.

A cylindrical, elastic, flexible sleeve or boot 36, formed of resilient material, such as synthetic rubber, or suitable plastic, extends through the actuator member 22 and the bore 16 of the part 10, which member is outwardly rolled over the rounded edge portion 24 of the actuator member 22 and over the rounded edge 32 of the part 10, and is formed with a thickened end portion 38 having an internal annular bead 40 which fits into the external groove 34 by which the sleeve is sealingly connected to the part 10. The sleeve 36 may be formed with an external, annular shoulder portion 42 at its rear end, which seats against the rear end face of the part 10 and is releasably retained thereon by a cap or washer member 44 secured to the rear end of the part 10 by bolts 46, or the like. The sleeve 36 is thus sealingly engaged with the part 10 and extends internally through the actuator 22 and part 10 to close off the moving parts of the mechanism from the flowway or passageway through the device to prevent contact of the working parts with the fluid which flows through the apparatus, while allowing the actuator to be freely extended from or retracted into the counterbore 18.

The actuator member 22 is provided with a number of rods or stems 48, one for each of the grooves 20, pivotally attached to the actuator member at their forward ends and extending rearwardly from the member in longitudinal alignment with the grooves. Each of the rods or shafts 48 carries at its free end a roller 50 which rolls in one of the grooves 20 externally of the sleeve 36, and which moves radially inwardly in engagement with the external surface of the sleeve upon inward movement of the actuator 22 in the counterbore 18 to indent and compress the sleeve inwardly to close the sleeve and shut off the flow of fluid through the flowway, as shown in FIG. 4.

The part 10 is provided with one or more peripherally spaced, longitudinal bores 52, located radially outside of the bore 16, and the actuator member 22 carries a shaft 54 for each of the bores 52 extending rearwardly from the actuator and which is slidably extended into the bore 52 to form a plunger therein. Each of the plungers 54 has a passageway 56 which is in communication at one end with the interior of the bore 52 and at its other end with the interior of the counterbore 18 inwardly of the actuator member 22. The bores 52 may be closed at their rear ends by screw plugs 58. The bores 52 thus become chambers in which suitable fluid, such as oil, may be contained which will flow through the passageways 56 into the counterbore 18 as the actuator member 22 moves inwardly in the counterbore, to effectively cushion such movement. Suitable means, such as a coil spring 60, may be disposed in each of the bores 52 in position for coaction with the plug 58 and plunger 54 to yieldingly urge the actuator member 22 outwardly in the counterbore 18.

Detent means may be provided for holding the actuator member 22 in its extended position, as seen in FIG. 1, which may take the form of an indentation 62 in each of the plungers 54 mediate its ends into which a ball 64 is yieldingly urged by a coil spring 66 located in a side opening 68 in the part 10 within which the spring is retained by a screw plug 70. Thus, the actuator 22 is held against movement from its extended position to its retracted position by the detent until the pressure created by the increase in flow of fluid in the flowway reaches a predetermined value, whereupon the detent will release, to allow the actuator member to move inwardly to actuate the sleeve to close the flowway.

A suitable filling opening 72 is provided in the part 10 which may be closed by a screw plug 73 and through which fluid may be introduced into the counterbore 18 inwardly of the actuator 22.

The flow control device, constructed as described above, may be incorporated in a flow line by employment of the means illustrated in FIG. 5, comprising a section of pipe 74, of somewhat larger diameter than that of the parts 10 and 12, which is formed with an internal flange or annular rib 76 which is internally threaded and into which the threaded end portion 14 of the part 10 may be screwed. Suitable means, such as a spacer or seal forming ring 78 surrounds the port 12 to hold the same in inwardly spaced relation to the section 74.

With the device thus installed in the section 74, the section may be connected into a flowline, such as a drill pipe or well pipe used in a well drilling operation to control the outflow of fluid therefrom.

In the operation of the invention, the flow control device will initially be open, as illustrated in FIG. 1, and as long as the flow of fluid therethrough remains below a predetermined rate, the actuator member 22 will be in its extended position, the rollers 50 being in their radially retracted positions, and the passageway through the sleeve 36 being fully open.

Should the rate of flow increase beyond a predetermined rate, however, the increased pressure on the actuator member in the direction of flow will cause the detent 64 to be released, whereupon the actuator will move inwardly in the counterbore 18 against the pressure of the springs 60 and the resistance of the fluid flowing through passageways 56 to move the rollers 50 downwardly and inwardly along the grooves 20 to collapse the sleeve 36 to close the flowway by elastically deforming the sleeve.

When the pressure against the actuator falls below the actuating pressure of the device, the spring 60 will return the actuator to the extended position allowing the sleeve to open.

It will thus be apparent that the invention provides a fluid flow control device, which is of simple design and rugged construction, and in which the internal moving parts of the mechanism are closed off and protected from contact with the flowing fluid.

Having thus clearly shown and described the invention, what is claimed as new and desired to secure by Letters Patent is:

1. In a device for controlling the flow of liquid through a flowway,
    a housing having a tubular body adapted to be positioned in the flowway,
    a tubular actuator slidably mounted within said body for longitudinal movement relative thereto,
    a flexible sleeve through which liquid may flow and which extends through said tubular actuator and said body to seal said actuator and body from the flow of liquid therethrough, and,
    means movably carried by said tubular actuator which apply a radially inwardly directed force to said flexible sleeve to close the liquid flow through said sleeve and which are actuated by the longitudinal movement of said actuator in response to an increase in the rate of flow of liquid through the flowway.

2. The device as claimed in claim 1 wherein said means carried by said tubular actuator includes
roller means engageable with the external surface of said flexible sleeve, and said housing is formed with
means shaped for engagement with said roller means upon movement of said tubular actuator in one direction to move said roller means radially inwardly to exert a radially directed force on said flexible sleeve to close the liquid flow through said sleeve.

3. The device as claimed in claim 2 wherein said body is formed with an inwardly opening longitudinally extending groove in which said roller means is rollably movable, said groove tapering inwardly longitudinally to cause said roller means to move radially inwardly upon movement of said actuator in said one direction.

4. The device as claimed in claim 1 wherein said flexible sleeve is attached to said tubular body at a reduced front end portion.

5. The device as claimed in claim 1 wherein said housing comprises a tubular body and an inlet guide.

6. The device as claimed in claim 1 including
means positioned for coaction with said actuator and said body to yieldingly resist longitudinal movement of said actuator.

7. The device as claimed in claim 1 wherein said means carried by said tubular actuator includes
plunger means which move longitudinally through bores in said body to cushion the movement of said actuator.

8. The device as claimed in claim 1 including
yieldable means positioned for coaction with said actuator and body to yieldingly urge said actuator to a position where said flexible sleeve is open to the flow of liquid.

9. The device of claim 7 including
yieldable means which coact with said plunger means and are positioned in said bores in said body.

10. The device of claim 7 including
detent means positioned for coaction with said plunger means and said body to yieldingly resist longitudinal movement of said actuator.

* * * * *